United States Patent [19]

Kieser et al.

[11] 4,378,637

[45] Apr. 5, 1983

[54] HEDGE CUTTING ARRANGEMENT

[75] Inventors: Hermann Kieser, Nürtingen; Norbert Schur, Metzingen, both of Fed. Rep. of Germany

[73] Assignee: Metabowerke GmbH & Co., Nürtingen, Fed. Rep. of Germany

[21] Appl. No.: 236,120

[22] Filed: Feb. 19, 1981

[30] Foreign Application Priority Data

Feb. 26, 1980 [DE] Fed. Rep. of Germany ....... 3007110

[51] Int. Cl.³ .............................................. A01G 3/04
[52] U.S. Cl. ...................................... 30/216; 30/233; 30/382
[58] Field of Search ................. 30/216, 217, 218, 219, 30/220, 286, 382, 228, 241, 242, 233

[56] References Cited

U.S. PATENT DOCUMENTS

| 3,177,584 | 4/1965 | Cockerill | 30/228 |
| 3,401,455 | 9/1968 | Gebauer | 30/228 |
| 3,802,222 | 4/1974 | Weber | 30/216 |

FOREIGN PATENT DOCUMENTS

| 2651231 | 5/1978 | Fed. Rep. of Germany | 30/216 |
| 2839002 | 3/1980 | Fed. Rep. of Germany | 30/216 |

Primary Examiner—Jimmy C. Peters
Attorney, Agent, or Firm—Michael J. Striker

[57] ABSTRACT

A hedge cutting arrangement has a cutting device, a drive motor for driving the cutting device, a coupling arranged between the cutting device and the drive motor, two handles for two-hand operation, and two switching devices including actuating members, wherein the coupling is connected with both actuating members so that even when only one of the actuating members moves to its switching off position, the cutting device disconnects from the drive motor.

32 Claims, 8 Drawing Figures

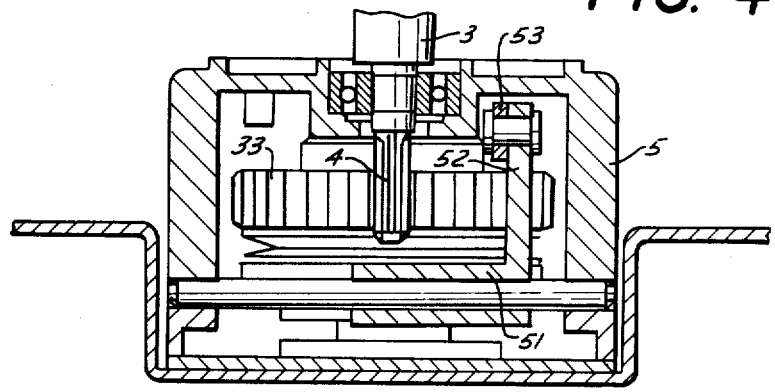
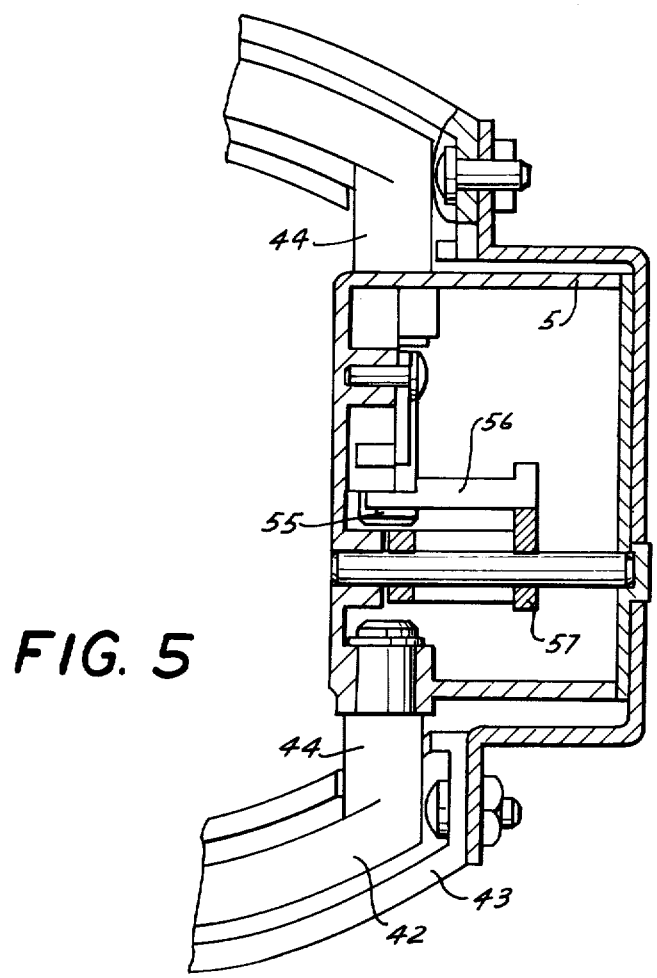

HEDGE CUTTING ARRANGEMENT

BACKGROUND OF THE INVENTION

The present invention relates to a hedge cutting or shearing arrangement with a motor driven cutting device and two handles associated with switching devices and having actuating members automatically movable to their switching off positions.

Hedge cutting arrangements of the above-mentioned general type are known in the art. In a known arrangement one switching device includes a coupling arranged between a drive motor and a cutting device actuated by an actuating member and disconnecting the drive motor from the cutting device in its switching off position. Such an arrangement is disclosed, for example, in the German Patent No. 1,295,994. The coupling in the arrangement disclosed in this patent is formed as a sliding coupling and actuated via the actuating member of one handle, whereas the actuating member of the other handle does not act upon the coupling. The arrangement is driven, as a rule, by universal high-speed motors, for example with the speed of 25,000 revolutions per minute. Thereby after switching on of the motor, because of the friction in the cutting arrangement, a post running up to approximately 6 seconds must take place. When in the known arrangement the switch for the electric motor is released, the other actuating member on the other handle remains pressed, so that the free hand, for example, in the event of cleaning of the arrangement, can get into the post running cutter.

Another known hedge cutting arrangement is disclosed in the German Gebrauchsmuster No. 7,635,497. In this arrangement braking of the post running of the cutter is provided. One actuating member acts upon one switch and additionally against the action of springs upon a brake. This braking arrangement is very expensive and additionally increases the weight of the arrangement. Moreover, the kinetic energy which is nullified by braking of the armature acts outwardly as a reaction moment and must be taken by the operator on the handle. The shorter is the braking time, the greater is this moment. There is a danger that the machine will fall out of the operator's hands.

Still another hedge cutting arrangement is disclosed in the German Gebrauchsmuster No. 6,805,183. A jaw coupling is used in this arrangement so that the arrangement can be stopped fast via the jaw coupling by the actuating member in one handle. However, it is not influenced by another actuating member, so that the accidents during continuing running of the machine can take place or at least an inconvenient operation during the constant drawing of a bracket handle against the spring must be taken into account.

SUMMARY OF THE INVENTION

Accordingly, it is an object of the present invention to provide a hedge cutting arrangement which avoids the disadvantages of the prior art.

More particularly, it is an object of the present invention to provide a hedge cutting arrangement for two-hand operation in which the danger of accidents is reduced and which has a construction with low expenditures and small weight.

In keeping with these objects and with others which will become apparent hereinafter, one feature of the present invention resides, briefly stated, in a hedge cutting arrangement having cutting means, a drive motor, a coupling arranged between the same, two handles, and two switching devices provided with actuating members, wherein the coupling is connected with both actuating members so that even when only one of the actuating members moves to its switching off position, the cutting means disconnects from the drive means.

In such a construction the cutting device stops in shortest time, particularly because of the friction between the cutters, regardless of which hand is removed from which handle or actuating member. Thereby the accidents because of the post running cutting device are eliminated.

In accordance with another feature of the present invention, the coupling of the arrangement is formed as a torsion spring coupling. This provides for additional highly advantageous results. The thus designed coupling requires a small space and its incorporation into the arrangement does not increase the outer dimensions of the latter. The weight increase which is a very important characteristic for a hedge cutting arrangement is neglectable, and the construction expenditures are very small. It is easily switchable and reliable in operation.

In accordance with still another advantageous feature of the present invention, the torsion spring abuts with its outer surface against an inner wall, in which case especially favorable dimensions of the construction are obtained. The inner wall is formed by cylindrical inner surfaces of two sleeves having identical diameters, wherein one of the sleeves is connected with the drive motor and the other of the sleeves is connected with the cutting device. The sleeves form parts of the abovementioned torsion spring coupling.

For obtaining a compact construction, the sleeves may support two eccentric discs on which connecting rods of the cutters of the cutting device are arranged. This sleeve is advantageously arranged in a recess provided in the other sleeve, and both sleeves are fitted on a shaft located in a transmission housing part.

In accordance with a further feature of the present invention, a slipping clutch is arranged between the other sleeve connected with the drive motor, and the drive motor. This sliding coupling is actuated in the event of blocking of the cutter and serves for protection of the transmission of the electric motor. An especially simple construction is provided when a gear connected with the drive motor is loosely fitted on the outer surface of the other sleeve, and a spring urges the gear into abutment against a flange member fixedly connected with the other sleeve.

The arrangement has an especially compact and robust construction, when a bush connected with the other sleeve is loosely arranged on the shaft, and the torsion spring of the torsion spring coupling is located between the bush and the inner wall of the sleeves. It is especially important when one end of the torsion spring is connected with the sleeve which is connected with the cutting device, whereas the rotation of the other end portion is hindered by a stop member actuated by the actuating members. Thereby not only the coupling can be released instantly so that the cutters stop because of the high friction and the motor can continue to run unbraked, but in addition the interposed torsion spring provides for an elastic connection which acts in dampening and part caring manner.

It is advantageous when the end portions of the torsion spring, which is formed as a helical spring, are bent so as to extend parallel to one another, and one end portion extends into an opening of the sleeve connected with the cutting device, whereas the other end portion extends into an opening provided in a collar of the above-mentioned bush arranged on the shaft. For switching the couplings, the core of the bush is provided with projections which cooperate with the stop members. The actuating members are connected in the region of the handles with the stop members by link elements which extend through or are supported in the housing.

In accordance with still a further feature of the present invention, an electromagnet is provided for displacing the stop members. The actuating members of both switching devices act on switches in such a manner that current passes through the electromagnet only in the switching on position of both actuating members, so that the coupling is in its operative connection. It is advantegous when the electromotor is formed as a solenoid or lifting magnet and its lifting rod is urged outwardly by a spring, whereas the free end of the lifting rod is connected, via an intermediate part, with the stop member formed as a pin.

The axes of the electric motor, the solenoid, and the pin are arranged advantageously parallel to one another and parallel to the shaft on which the sleeves are fitted. The switches and the electric motor are connected in series with one another and one of the switches is a two-pole switch and arranged to switch on and switch off the drive motor formed as an electric motor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 4 is a view showing a section taken along the line 4—4 in FIG. 1;

FIG. 5 is a view showing a section taken along the line 5—5 in FIG. 2;

DESCRIPTION OF PREFERRED EMBODIMENTS

Figure 1:
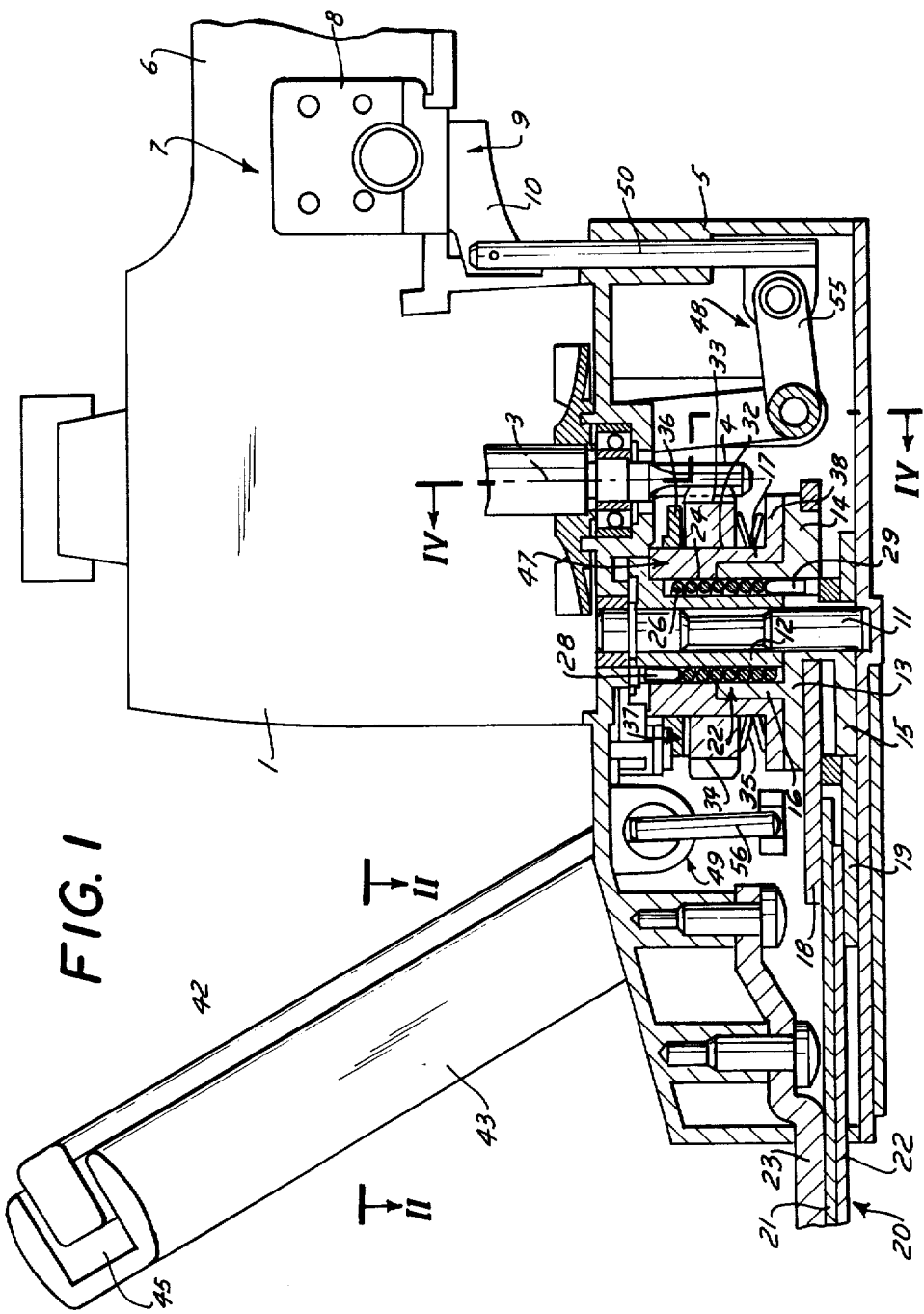
FIG. 1 is a view showing a section of a hedge cutting arrangement in accordance with the present invention, taken along the line 1—1 in FIG. 2.
Figure 2:
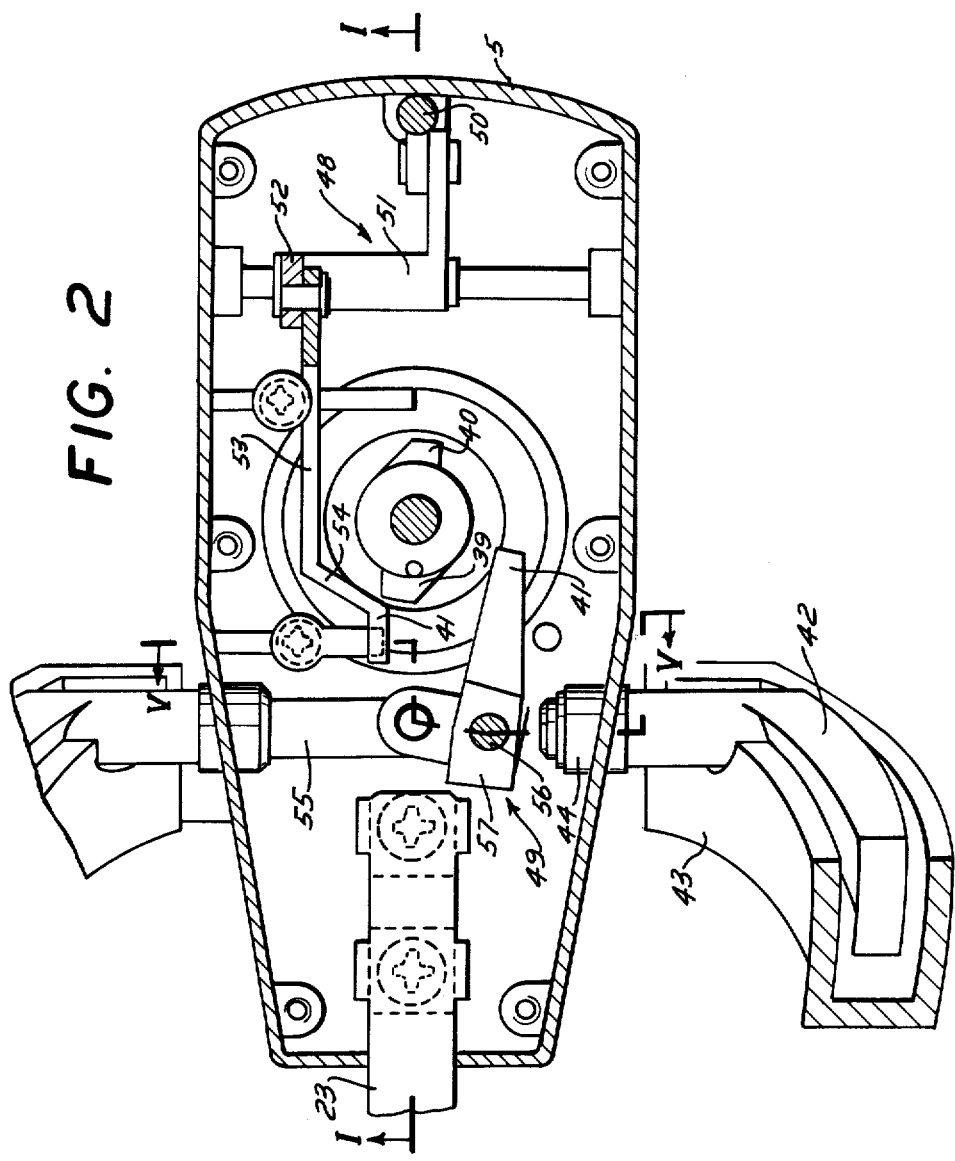
FIG. 2 is a view showing a section of the inventive hedge cutting arrangement, taken along the line 2—2, wherein a drive motor is removed and a cover side of a transmission housing part is shown in section.
Figure 3:
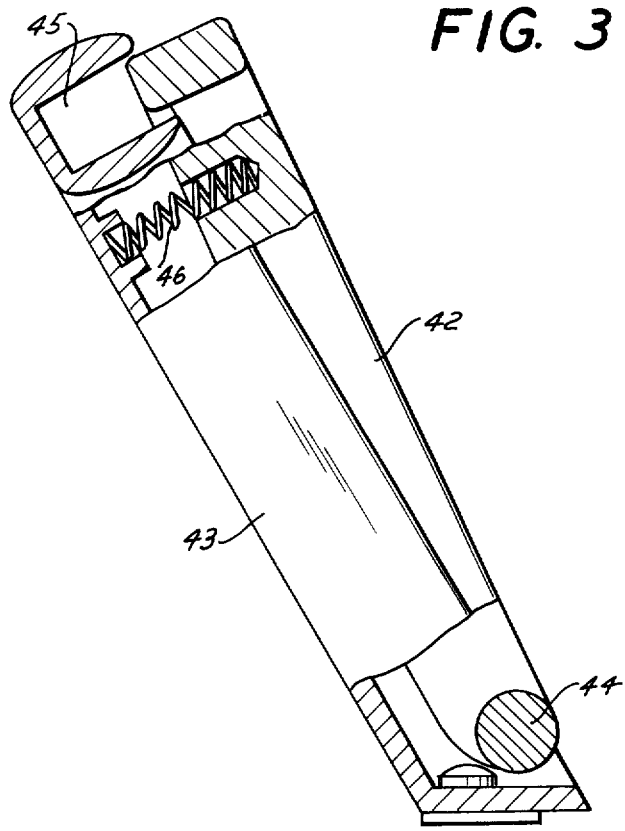
FIG. 3 is a view showing an enlarged section of one handle of the inventive hedge cutting arrangement.

A hedge cutting arrangement in accordance with the present invention has a motor housing part 1 in which a drive motor formed as an electric motor 2 is accommodated. The electric motor 2 has a shaft 3 with an armature pinion 4, which extends into a transmission housing part 5 connected with the motor housing part 2.

Figure 8:
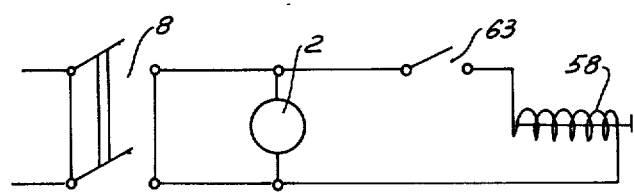
FIG. 8 is a view showing a diagram of a switching device of the inventive hedge cutting arrangement.

The motor housing part 1 carries a handle 6 formed as a supporting handle. A switching device 7 is accommodated in the handle 6 and includes a switch 8 with an actuating member 9 formed as a switch pusher 10. The electric motor 2 is switched on and off by the switch 8, as can be seen from FIG. 8.

A shaft 11 is fixedly mounted in the transmission housing part 5, and a bush 12 is loosely mounted on the shaft 11 for rotation relative to the latter. A sleeve 13 is guided on the shaft 11 and has a projecting portion 16 extending into a further sleeve 17. The sleeve 13 carries two eccentric discs 14 and 15, and connecting rods 18 and 19 are arranged on the eccentric discs and connected with cutters 21 and 22 which form a cutting device 20. The cutters 21 and 22 are partially covered from above by a guide 23.

The cylindrical inner surfaces of the sleeves 13 and 17 together form an inner wall 24, and an outer surface 25 of a torsion spring 26 abuts with a prestress against the inner wall 24 so as to form a coupling 27. The torsion spring 26 is arranged thereby between the sleeves 13, 17 and the bush 12. The sleeves 13 and 17 form coupling parts, and the outer surface 25 of the torsion spring 26 provides for force transmission between these parts.

The torsion spring 26 has two end portions 28 and 29 which are bent to extend parallel to the shaft 11. The end portion 28 extends into an opening 30 of the bush 12, whereas the end portion 29 extends into an opening 31 of the sleeve 13. A gear 33 is loosely arranged on an outer surface 32 of the sleeve 13 and engages with the armature pinion 4. The gear 33 is urged with its end surface 34 by a spring 35 formed as a cup-spring, against a flange 36 which is axially immovably mounted on the sleeve 17, so as to form a sliding coupling 37. The spring 35 is arranged with prestress between the gears 33 and a collar 38 of the sleeve 17.

The bush 12 has an end portion which extends outwardly beyond the sleeve 17 and is provided with two projections 39 and 40 cooperating with stop members 41. Actuating members 9 and 42 act upon the stop members 41, and the actuating member 42 is arranged on a second handle 43 formed as a bracket handle. Whereas the handle 43 is fixedly connected with the transmission housing 5, the actuating member 42 is mounted pivotable about an axis 44. The actuating member 42 can be received in a recess 45 of the handle 43 and is pressed outwardly under the action of the spring 46. The coupling 27 forms a second switching device 47 which acts upon the cutting device 20.

In the embodiment shown in FIGS. 1–5, the stop members 41 are moved mechanically by the actuating members 9 and 42 via link element 48 and 49. The switch pusher 10 is connected via a rod 50 with an angular lever 51, and a further rod 53 extends from arm 52 of the angular lever 51 and has a bent portion 54 forming one stop member 41. The other link element 49 is formed by a bolt member 55 which lies in the axle 44, and a pin 56 extends from the bolt member 55 and engages with an angular lever 57 which forms the other stop member 41.

Figure 6:
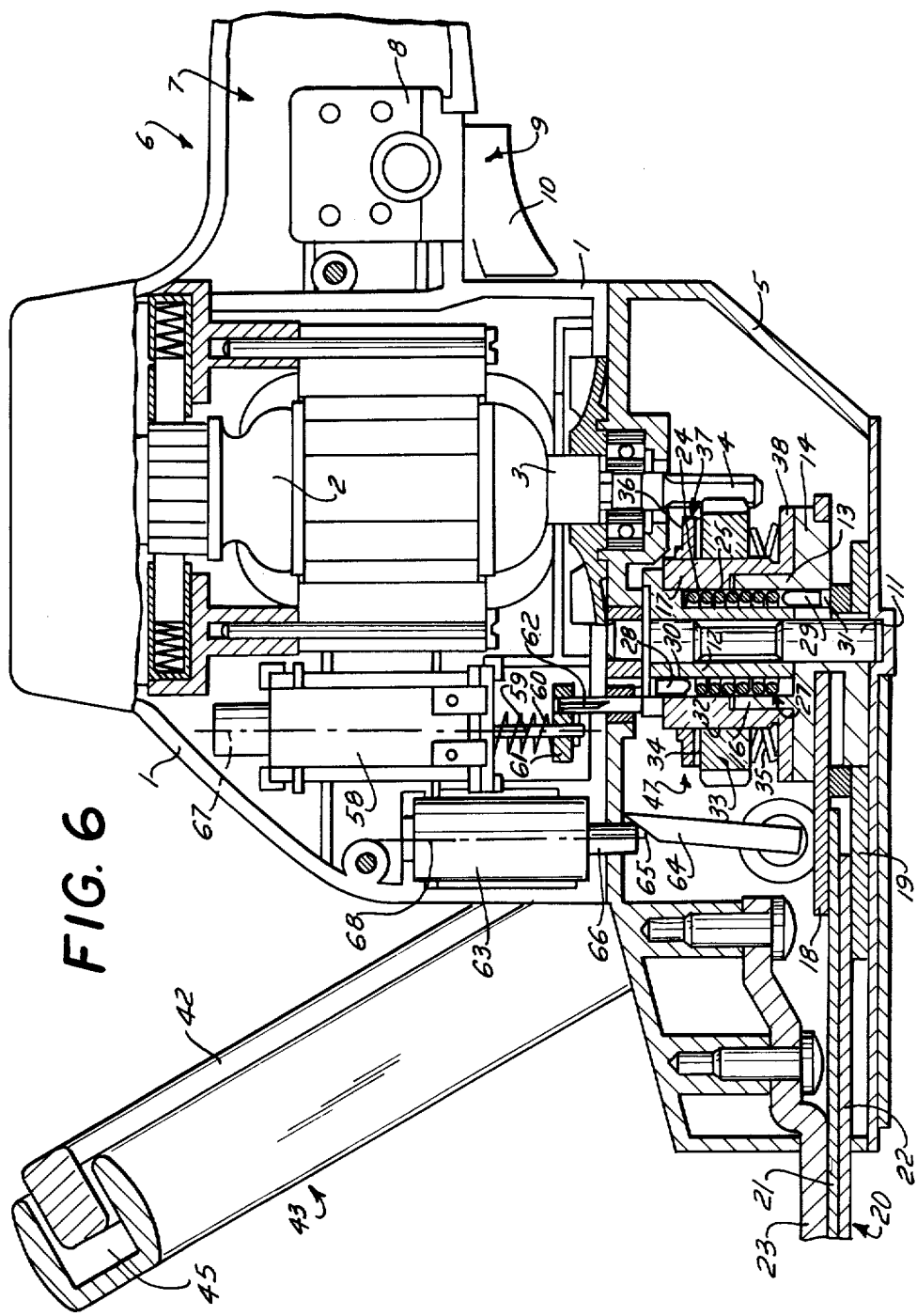
FIG. 6 is a view showing a section of a hedge cutting arrangement in accordance with a second embodiment of the invention, taken along the lines 6—6 in FIG. 7.
Figure 7:
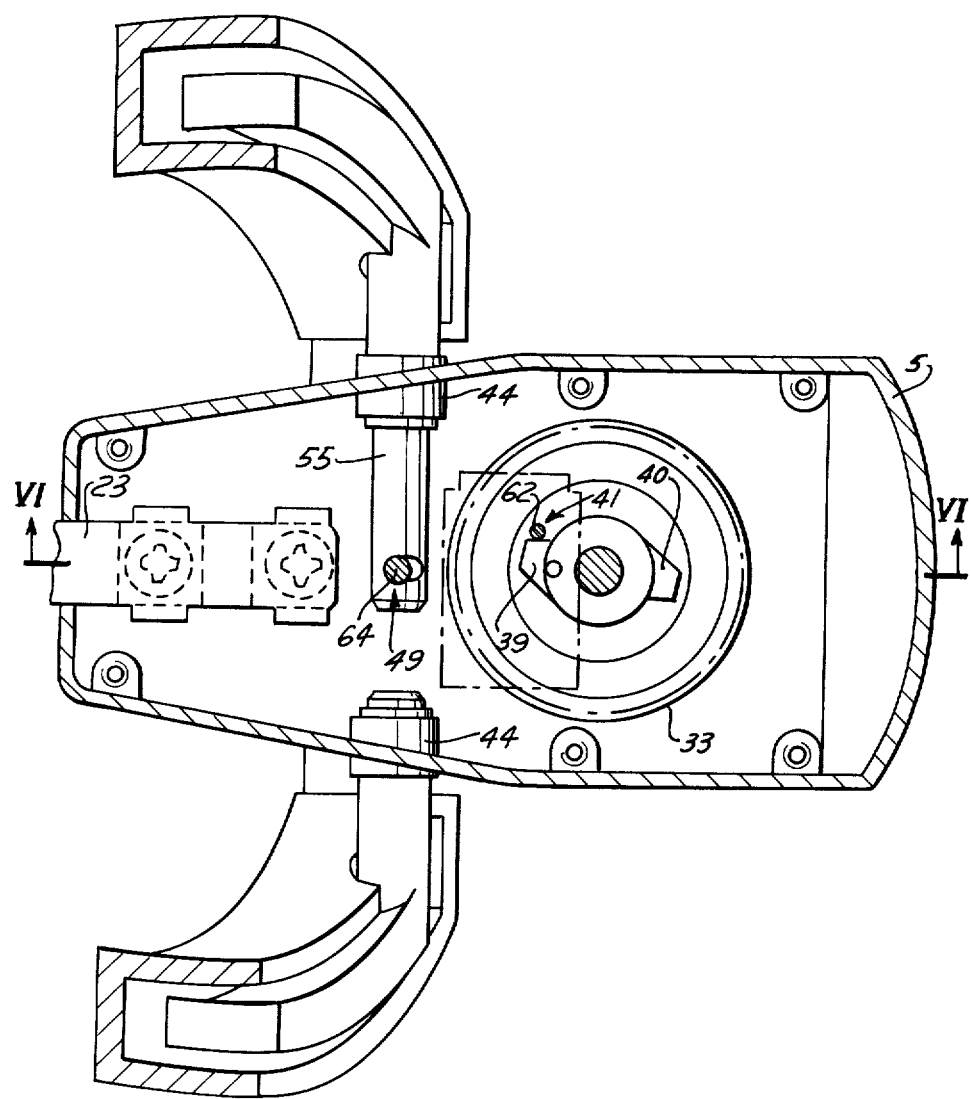
FIG. 7 is a view substantially corresponding to the view of FIG. 2 but showing the arrangement of FIG. 6.

In the embodiment shown in FIGS. 6 and 7, the coupling 27 is switched electrically. An electromagnet 58 formed as a solenoid is arranged in the motor housing part 1. The electromagnet 58 has a lifting rod 59 which is urged outwardly by a spring 60 in the event of absence of current. The lifting rod 59 has an end portion provided with an intermediate part 61, and a pin 62 forming the stop member 41 is mounted on the intermediate part 61. A further switch 53 operates from the actuating member 42.

A lever 64 is arranged on the bolt member 55 and has a free end portion provided with an inclined surface 65. The lever 65 cooperates with a switch pin 66 of the switch 63. The shaft 3 of the electric motor 2, the shaft 11, an axis 67 of the electric magnet 58, an axis 68 of the switch 63, and the pin 62 are arranged parallel to one another. As can be seen from FIG. 8, the switch 8, the switch 63, and the electromagnet 58 are arranged in series. The switch 8 is formed as a two-pole switch and arranged for switching on and switching off of the electric motor 2.

For driving the cutting device 20 in operation, both actuating members 9 and 42 must always be pressed on the handles 6 and 43. As soon as one actuating member 9, 42 is released, it is automatically displaced outwardly under the action of the spring, and the cutters 21 and 22 are stopped because of the relatively high friction force, whereas the electric motor 2 can continue to run unbraked. When in the arrangement shown in FIGS. 1-5 the switch pusher 10 is released, the electric motor 2 is switched off, and the stop member 41 is moved via the link element 48 so that it extends into the region of the projections 39 and 40 and switches off the bush 12. When the rotary movement is suddenly interrupted, the torsion spring is arrested so that the friction connection with the inner wall 24 is interrupted. The coupling is thereby released. Since the sleeve 13 is connected, via the torsion spring 26, directly with the stopped bush 12, the fast stopping of the cutters 21 and 22 is supported, wherein the electric connection is especially advantageous. The torsion spring 26 is wound to the left, the armature pinion 4 rotates to the right as seen from above, and the gear 33 and thereby the bush 12 rotate to the right. During the start, the spring is tightened and transmit the rotary movement, by the force transmitting connection from the bush 12 to the sleeve 13. When the stop member 41 is displaced into the path of rotation of the projections 39 and 40, the torsion spring 26 is arrested, and the continuous running of the bush 12 to the right corresponds to rotation of the torsion spring 26 to the left, so that the force transmission is interrupted. When the actuating member 43 is released, the other stop member 41 displaces via the link element 49 into the path of rotation of the projections 39 and 40, so that the coupling 27 is released in identical manner. If the switch pusher 10 remains pressed, the electric motor runs further, but the switching device 20 is stopped.

The operation of the hedge cutting device shown in FIGS. 6 and 7 is carried out in the same manner. When the actuating member 9 is released, the electric motor 2 is switched off; but the electromagnet 58 has no current, so that the coupling 27 is forced out in the above-described manner and the cutters 21 and 22 are stopped, whereas the electric motor 2 can continue to run unobjectionably. When the actuating member 42 is released, the switch pin 66 is pressed inwardly via the lever 64 and the switch 63 opens, so that the electromagnet 58 again has no current and the coupling 27 is dosconnected.

It will be understood that each of the elements described above, or two or more together, may also find a useful application in other types of constructions differing from the types described above.

While the invention has been illustrated and described as embodied in a hedge cutting arrangement it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hedge cutting arrangement, comprising cutting means; a drive motor arranged to drive said cutting means; a coupling arranged between said drive motor and said cutting means and connecting said drive motor with and disconnecting said drive motor from said cutting means; two handles arranged for two hand operating the arrangement; and two switching devices each associated with a respective one of said handles and having an actuating member movable between switching on and switching off positions, said coupling being connected with both actuating members so that when even only one of said actuating members moves to its switching off position, said cutting means disconnects from said drive motor.

2. A hedge cutting arrangement as defined in claim 1, wherein said coupling is a torsion spring coupling.

3. A hedge cutting arrangement as defined in claim 2, wherein said torsion spring coupling has an inner wall, and a torsion spring having an outer surface arranged to abut against said inner wall with prestress.

4. A hedge cutting arrangement as defined in claim 3, wherein said torsion spring coupling includes two cylindrical sleeves having identical diameters and inner surfaces which together form said inner wall, one of said sleeves being connected with said cutting means, whereas the other of said sleeves is connected with said drive motor.

5. A hedge cutting arrangement as defined in claim 4, wherein said coupling means includes two cutting elements; and further comprising connecting means for connecting said one sleeve with said two cutting elements.

6. A hedge cutting arrangement as defined in claim 5, wherein said connecting means includes two eccentric discs carried by said one sleeve, and two connecting rods which connect said eccentric discs with said cutting elements.

7. A hedge cutting arrangement as defined in claim 4, wherein said other sleeve which is connected with said drive motor is provided with a recess, said one sleeve which is connected with said cutting means being arranged in said recess of said other sleeve.

8. A hedge cutting arrangement as defined in claim 4; and further comprising transmission means provided between said drive motor and said torsion spring coupling, a housing including a transmission housing part accommodating said transmission means, and a shaft which is located in said transmission housing part and on which said sleeves are arranged.

9. A hedge cutting arrangement as defined in claim 9; and further comprising a slipping coupling arranged between said other sleeve and said drive motor.

10. A hedge cutting arrangement as defined in claim 9, wherein said other sleeve has an outer surface; and further comprising a flange member axially immovably connected with said other sleeve for joint rotation therewith, said slipping coupling including a gear connected with said drive motor and loosely mounted on the outer surface of said other sleeve, and a spring urging said gear into abutment against said flange member.

11. A hedge cutting arrangement as defined in claim 10, wherein said other sleeve has a collar, said spring being arranged with prestress between said collar of said other sleeve and said gear.

12. A hedge cutting arrangement as defined in claim 11, wherein said spring which is arranged between said collar of said other sleeve and said gear, is formed as a cup spring.

13. A hedge cutting arrangement as defined in claim 8; and further comprising a bush which is loosely arranged on said shaft and connected with said other sleeve, said torsion spring being located between said inner surfaces of said sleeves and said bush.

14. A hedge cutting arrangement as defined in claim 4, wherein said torsion spring has a first end portion connected with said one sleeve, and a second end portion, said switching devices having stop members which are actuated by the respective actuating members and at least one of which stop members hinders rotation of said other end portion of said torsion spring.

15. A hedge cutting arrangement as defined in claim 14; and further comprising a shaft on which said sleeves are arranged, and a bush connected with said other sleeves and loosely arranged on said shaft so that said torsion spring is located between said bush and said inner surfaces of said sleeves, said end portions of said torsion spring being bent so as to extend parallel to one another, said one sleeve having a first opening in which said first end portion of said torsion spring engages, said bush having a second opening in which said second end portion of said torsion spring engages.

16. A hedge cutting arrangement as defined in claim 15, wherein said bush has a collar provided with said second opening in which said second portion of said torsion spring engages.

17. A hedge cutting arrangement as defined in claim 16, wherein said collar of said bush has two projections cooperating with said stop members of said switching devices.

18. A hedge cutting arrangement as defined in claim 17, wherein said switching devices include link elements connecting said actuating members with said stop members in the region of said handles.

19. A hedge cutting arrangement as defined in claim 18; and further comprising transmission means provided between said drive motor and said torsion spring coupling, and a housing including a transmission housing part accommodating said transmission means, said link elements extending through said transmission housing part.

20. A hedge cutting arrangement as defined in claim 19, wherein said link elements are supported in said transmission housing part.

21. A hedge cutting arrangement as defined in claim 18, wherein said drive motor is an electric motor, one of said switching devices being associated with said electric motor and having a switch and a switch pusher, one of said link elements including a rod member with two end portions one of which end portions is connected with said switch pusher, whereas the other of said end portions is arranged to act upon a respective one of said stop members.

22. A hedge cutting arrangement as defined in claim 21, wherein said one link eleme.. has an angular lever with one end section connected with said other end portion of said rod member, and another end section pivotally connected with a further rod which has a bent part acting upon said one stop member.

23. A hedge cutting arrangement as defined in claim 14, wherein said handle include one handle and another handle, said actuating members including one actuating member and another actuating member, the other of said handles being formed as a bracket and having a recess for receiving the other of said actuating members; and further comprising a spring urging said other actuating member outwardly of said other handle.

24. A hedge cutting arrangement as defined in claim 23, wherein the other of said stop members is formed as an angular lever; and further comprising a bolt member and a pin extending therefrom, said other actuating member having one end portion which acts upon said bolt member, and said pin acting upon said angular lever which forms said other stop member.

25. A hedge cutting arrangement as defined in claim 14; and further comprising an electromagnet arranged for moving said one stop member, and switches upon which said actuating members of both said switching devices act so that current passes through said electromagnet only in said switching on position of both said actuating members.

26. A hedge cutting arrangement as defined in claim 25, wherein said one stop member is formed as a pin, said electromagnet being formed as a solenoid which has a lifting rod connected with said pin and is provided with a spring urging said lifting rod outwardly.

27. A hedge cutting arrangement as defined in claim 26, wherein said lifting rod has a free end portion; and further comprising an intermediate member connecting said free end portion of said lifting rod with said pin which forms said one stop member.

28. A hedge cutting arrangement as defined in claim 27, wherein said drive motor is an electric motor; and further comprising a shaft on which said sleeves are arranged, said electric motor, said electromagnet, said pin, and said shaft having axes which are parallel to one another.

29. A hedge cutting arrangement as defined in claim 28; and further comprising a housing having a motor housing part which accommodates said electric motor, said electromagnet being arranged in said motor housing part near said electric motor.

30. A hedge cutting arrangement as defined in claim 25, wherein said switches including one switch and another switch each having a switch pusher, said actuating members including one actuating member and another actuating member, said handles including one handle and another handle, the other of said handles being formed as a bracket and having a recess for receiving the other of said actuating members; and further comprising a bolt member and a lever extending therefrom, said other actuating member having a free end portion which acts upon said bolt member so that said lever acts upon the switch pin of the other of said switches.

31. A hedge cutting arrangement as defined in claim 30, wherein said lever has an inclined face which engages with said switch pusher of said other switch.

32. A hedge cutting arrangement as defined in claim 25, wherein said drive motor is an electric motor, said switches and said electromagnet being arranged in series with one another, said switches including one switch which is a two-pole switch and arranged to switch on and switch off said electric motor.

* * * * *